United States Patent

[11] 3,632,200

[72] Inventor Gerald J. Frey
    1834 Devon Road, Pasadena, Calif. 91103
[21] Appl. No. 865,613
[22] Filed Oct. 13, 1969
[45] Patented Jan. 4, 1972

[54] MAGAZINE-TYPE SLIDE PROJECTOR
    11 Claims, 12 Drawing Figs.
[52] U.S. Cl. .................................................... 353/109,
    40/78.09, 40/98, 353/103
[51] Int. Cl. ...................................................... G03b 21/28,
    G09f 11/26, G09f 11/32
[50] Field of Search .......................................... 353/103,
    108, 109, 110, 107; 40/98, 68.6, 78.09

[56] References Cited
UNITED STATES PATENTS
3,170,369  2/1965  Frey et al. .................... 353/106
3,453,397  7/1969  Miller et al. .................. 179/100.2

Primary Examiner—Leonard Forman
Assistant Examiner—Steven L. Stephan
Attorney—Fulwider, Patton, Rieber, Lee & Utecht ABSTRACT: A slide projector of the type having a removable magazine supporting a series of slides on an endless carrier for movement one by one into a projection position at one open end of the magazine. The latter has positioning elements coacting with elements of the projector case to align the magazine accurately relative to the optical system as an incident to insertion of the magazine in a recess in the projector, and a cooling system is included with a squirrel cage fan drawing air through the area of the illuminating lamp, through the lens area, and directly through the projection gate to cool the slide therein. An indexing drive mechanism is controlled electrically for either semiautomatic or timed automatic operation, and a scanner wheel is provided for fully manual operation, the scanner wheel having a movable cover controlling elements of the electrical control circuit. In both semiautomatic and automatic operation, the lamp is controlled to fade out between slides, and a signal device indicates completion of the full series of slides. The slide carrier and the clips thereon are also of novel construction for more effective operation and ease of manufacture.

INVENTOR.
GERALD J. FREY
BY Fulwider, Patton, Rieber
Lee, and Utecht
ATTORNEYS

INVENTOR.
GERALD J. FREY
BY Fulwider, Patton, Rieber,
Lee, and Utecht
ATTORNEYS

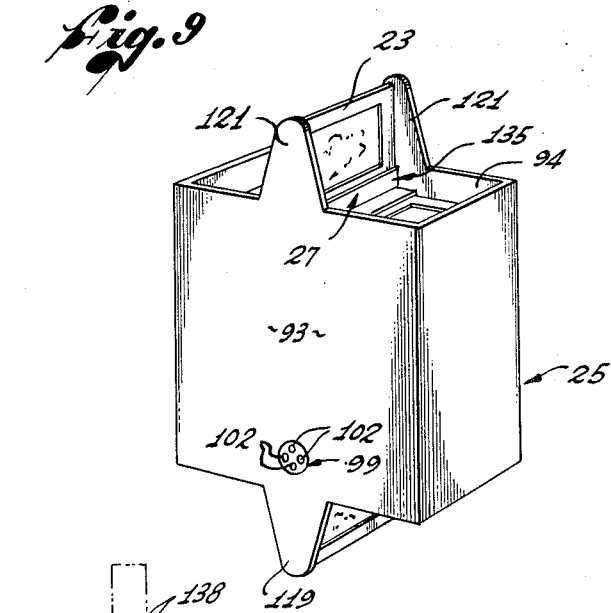
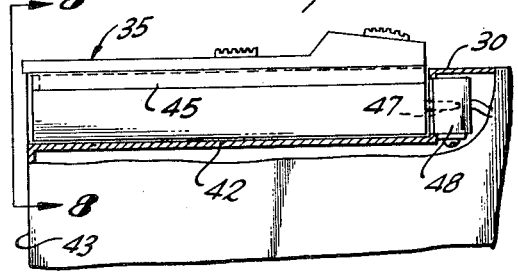
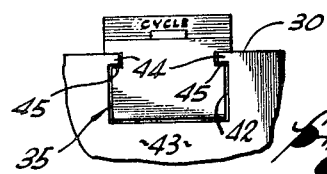
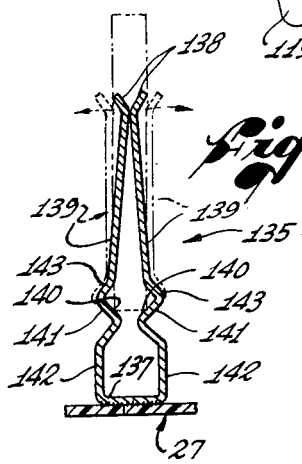
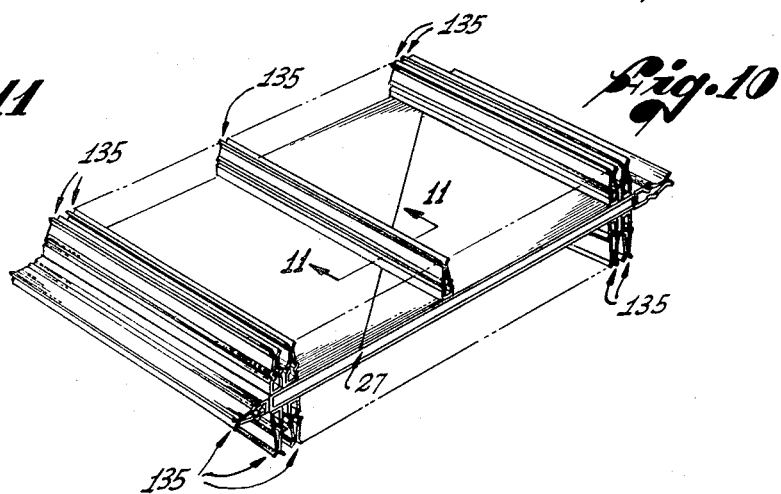
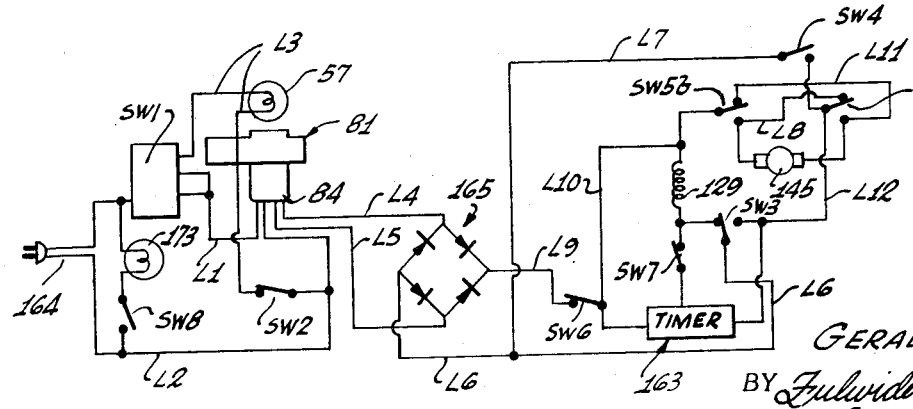

MAGAZINE-TYPE SLIDE PROJECTOR

BACKGROUND OF THE INVENTION

This invention relates to the projection of film transparencies or slides, and relates more particularly to an automatic slide projector of the type having interchangeable magazines each holding a group of slides adapted to be fed or indexed successively into a projection position, either in a manually controlled semiautomatic operation or completely automatically under the control of a timing device.

The general type of slide projector for which the present invention is primarily intended is shown and described in U.S. Pat. No. 3,170,369. This projector is basically characterized by its use of a magazine having an endless flexible carrier for a plurality of slides, the slides being held in clips mounted on the carrier so as to be advanced one by one into a projection gate in the optical system as the carrier is driven step by step about spaced shafts that support the belt within the magazine. One shaft is disposed immediately above the projection gate so that each slide passing around the shaft swings into the gate during one step of the carrier, and then swings out of the gate after projection to continue moving along the endless path defined by the carrier. This type of projector has numerous advantages in compactness of slide storage, ease of loading slides into the magazine, simplicity and effectiveness of the indexing operation, quietness, ease of changing magazines, and the like. On the other hand, the aforesaid patent deals only with the more basic aspects of this type of projector, and the present invention is concerned with an improved projector of the same basic type.

SUMMARY OF THE INVENTION

The present invention resides in a slide projector of the foregoing general character which is of new and improved construction for more effective and convenient operation and higher quality of projection. In general, these objectives are achieved by incorporating in the projector several improved features which cooperate to improve the magazine and slide positioning; to more effectively cool the optical elements and particularly the area forming the projection gate so as to avoid the effect of excessive heating of slides during projection; to simplify the coupling of the magazine to the driven assembly as an incident to insertion and positioning of the magazine; and to provide commercially suitable carrier and clip constructions, the clip being of novel design for positioning each slide in the projection gate out of the line of adjacent slides to avoid interference with projection.

In addition, the invention contemplates the provision of a novel scanning mechanism for fully manual and very rapid scanning of slides; a highly attractive fadeout, fade-in effect between slides during both semiautomatic and automatic operation; and a very simple but effective means for signaling completion of projection of the series of slides in the magazine. An improved control unit is removably mounted in a novel manner on the projector to serve alternatively as a remote control unit.

Other objects and advantages of the invention will become apparent from the following detailed description, taken in conjunction with the accompanying drawings.

BRIEF DESCRIPTION OF THE DRAWINGS

FIG. 7 is a portion of the side elevation, partly in cutaway section, of the projector housing, illustrating the support and electrical connection of the control unit in the stored position;

FIG. 8 is a fragmentary rear elevation of the projector and the control unit, taken along the line 8—8 of FIG. 7;

FIG. 9 is a perspective view of the improved slide magazine of the projector;

FIG. 10 is a perspective view of the improved endless belt and slide clips carried by the slide magazine of the projector;

FIG. 11 is an enlarged fragmentary cross section taken through the belt and the novel spring clip, substantially along the line 11—11 of FIG. 10; and FIG. 12 is a schematic wiring diagram of the electric circuit of the projector.

DETAILED DESCRIPTION

Figure 1:
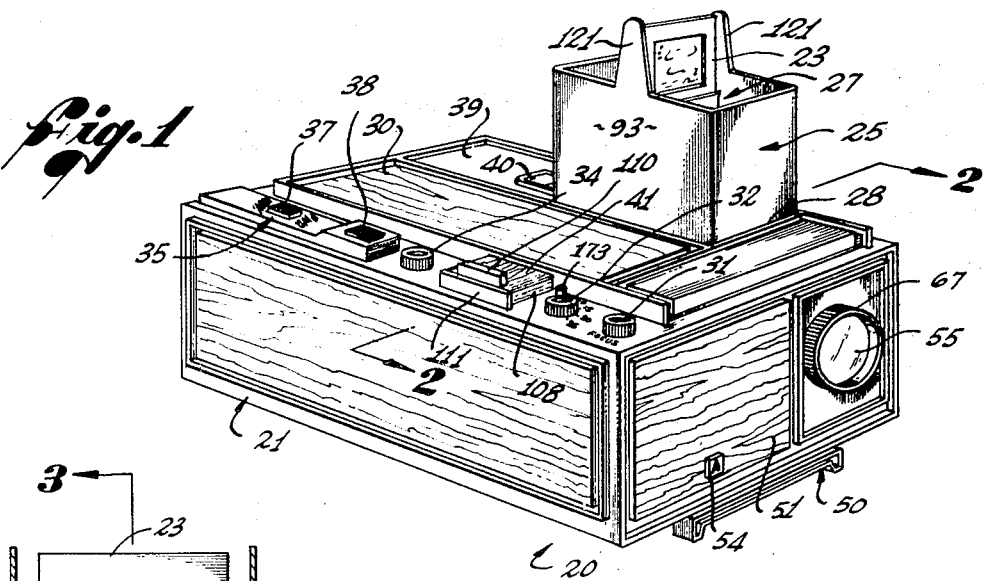
FIG. 1 is a perspective view of a slide projector embodying the novel features of the present invention.

As shown in the drawings for purposes of illustration, the invention is embodied in an improved slide projector 20 of the general type disclosed in the aforesaid patent, and comprising generally a boxlike outer case 21 housing an optical system 22 for projecting transparencies or slides 23 while the latter are disposed in a projection gate 24 beneath a magazine 25 supporting a group of the slides on an endless flexible carrier 27. The magazine is removably fitted in a recess 28 in the top of a case, and supports the slide carrier so that successive slides move into and then out of the projection gate as the carrier is driven step by step along its path by a reversible, indexing drive mechanism 29 (see FIGS. 4 and 5) drivingly connected to the slide carrier. Suitable controls are provided for both semiautomatic and automatic actuation of the drive mechanism.

More specifically, the projector case 21 has a generally flat top wall 30 with a row of control elements 31 to 38 arranged along one side, the left side as viewed in FIG. 1, and the magazine recess 28 is formed along the opposite side to receive the lower portion of the magazine 25 with the upper portion thereof projecting upwardly beyond the top wall as shown in FIG. 1. A sliding cover 39 is mounted on top of the case to close the recess when the projector is not in use, the cover being slidable rearwardly along the top wall to the out-of-the-way position shown, to open the recess to receive a magazine. A button 40 on the forward portion of the cover facilitates gripping of the cover for such sliding movement.

The control elements 31 to 38, from front to rear along the left side of the top wall 30, include a focusing knob 31, an automatic time-sequence knob 32 for placing the projector in a fully automatic mode of operation, a scanner wheel 33 (FIGS. 2 and 5) for feeding slides 23 rapidly through the projector 20 under fully manual control and normally disposed beneath a sliding cover 41, an on-off knob 34, and a control unit 35 removably recessed into the left-rear corner portion of the top wall. The control unit carries a reversing-switch operator 37 for selecting the direction of feed of slides 12 in the magazine 25, and a cycle-switch operator 38 for manual initiation of a slide-changing cycle when the projector is in the manually actuated, semiautomatic mode of operation.

To permit operation of the projector 20 from a remote location, the control unit 35 is removable from the projector and may be connected thereto by an extension cord (not shown) for transmitting electrical operating signals from the cycle and reversing switch operators 37 and 38 to control circuit components housed in the projector. For this purpose, the control unit is disposed in an elongated recess 42 (FIGS. 7 and 8) having an open rear end in the rear wall 43 of the case 21 through which the unit is inserted, the recess having an open upper side defined by the top wall 30 of the case so that the upper portion of the unit may extend upwardly beyond the top wall. To hold the unit removably in the recess, two elongated ribs 44 (FIG. 8) are formed on the sidewalls of the recess 42 immediately below the top wall to interfit with two longitudinal grooves 45 in the opposite sides of the control unit, thereby preventing movement of the unit upwardly out of the recess but permitting the unit to slide rearwardly out of the recess and free of the case.

On the front end of the control unit 35 is an electrical connector formed by three forwardly extending prongs 47 which are engageable with an aligned, mating connector in the form of a socket 48 inside the case in front of the recess. Thus, the unit is "plugged in" automatically as an incident to its insertion in the recess. When it is removed for remote operation, the extension cord is connected at one end to the prongs 47 and at the other end to the socket 48.

Figure 3:
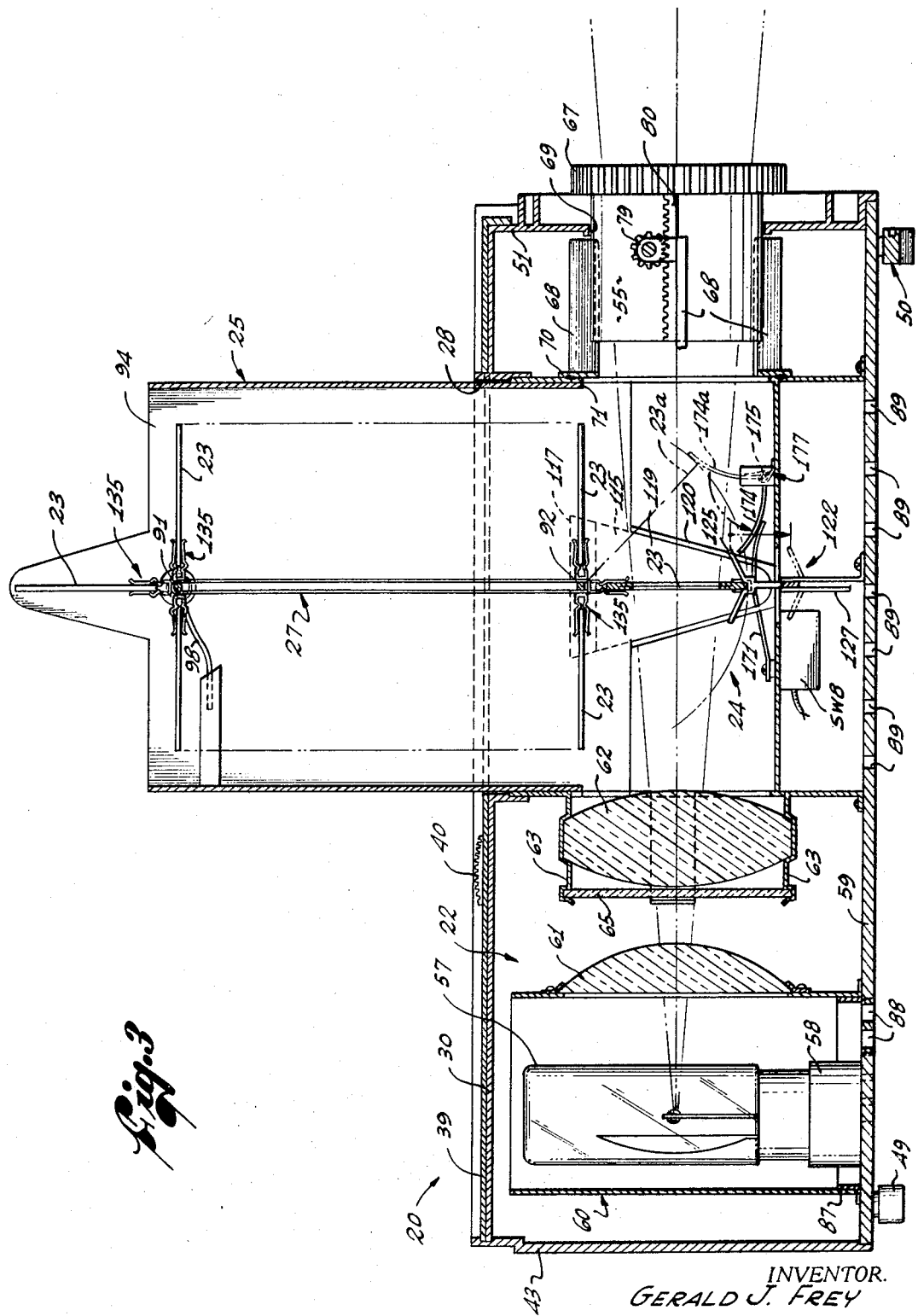
FIG. 3 is a sectional view taken along the line 3—3 of FIG. 2, illustrating the optical system, the magazine, and the alignment mechanism of the projector.
Figure 4:
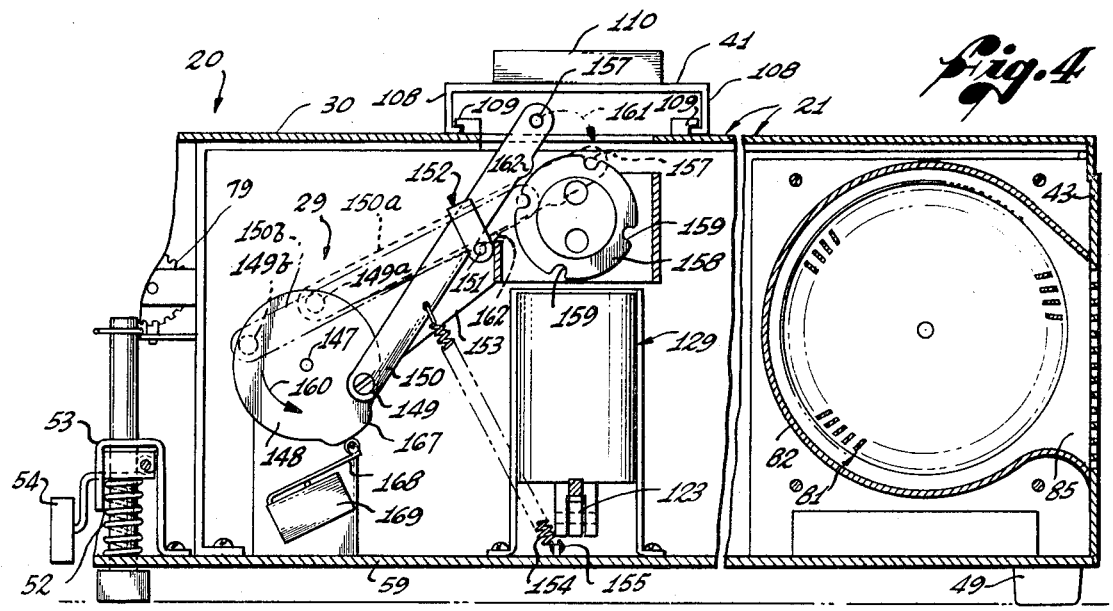
FIG. 4 is a fragmentary sectional view taken substantially along the line 4—4 of FIG. 5, illustrating a portion of the drive mechanism and cooling system of the projector.

As shown in FIGS. 3 and 4, the case 21 is supported on rear legs 49 beneath its two rear corners, and on a front leg assembly 50 centered beneath the front wall 51 and vertically adjustable to align the projector 20 with a projection screen (not shown). The front leg assembly is urged downwardly by a spring 52 (FIG. 4) and held in selected positions by a latch 53 that is released by pressing a button 54 accessible from the front of the case.

The optical system 22 for illuminating and projecting slides 23 is best shown in FIGS. 3 and 4 wherein it will be seen that a projection or focusing lens assembly 55 is mounted in the front wall 51 of the case 21, offset from the center thereof toward the right side of the projector as viewed in FIG. 1, in front of the lower portion of the magazine recess 28. Adjacent the rear wall 43 of the case is an upstanding lamp 57 which is fitted in a socket 58 on the bottom wall 59 of the case, the lamp being surrounded by an open-ended baffle 60 having an apertured front wall in which a condensing lens 61 is mounted in optical alignment with the focusing lens assembly 55. Between the condensing lens and the magazine recess, and optically aligned with the lamp 57 and the lens assembly, is a culminating lens 62 that is supported on flanged mounting brackets 63 on the rear side of the magazine.

The foregoing optical system is of basically conventional construction, as shown by the aforesaid patent. The space in the lower portion of the magazine recess 28 defines the slide-projection gate 24 in which a slide 23 depending from the lower end of the slide carrier 27 is positioned to be projected through the focusing lens assembly when the lamp 57 is turned on. A planar disc 65 of transparent, heat-absorbing material is fast on the rear ends of the lens mounting brackets 63 to form a heat barrier between the condensing and culminating lenses 61, 62 and thus protects the slide in the projection gate by reducing the amount of heat transmitted through the culminating lens.

For ease of adjustment of the focusing lens assembly 55, which herein is in the form of a horizontally disposed barrel having a flange 67 on its front end outside the front wall 51 of the case 21, the assembly is slidably supported on a plurality of horizontal tracks 68 that are angularly spaced around the barrel and extend forwardly from the front wall of the magazine recess 28 toward a circular hole 69 in the front wall of the case. Herein, there are three such tracks which are supported on an arcuate band 70 (FIGS. 3 and 5) secured to the front wall of the magazine recess around a hole 71 therein.

While the focusing assembly 55 may be pulled out or pushed in manually, precise focusing is accomplished by rotating the knob 31 which is fast on the upper end of a shaft 72 (FIG. 5) journaled in the case and having a pinion gear 73 on its lower end in meshing engagement with a bevel gear 74 fast on a horizontal shaft 75. The latter is journaled adjacent the bevel gear in a bracket 77 and extends across the front of the case toward the lens barrel and through a flange 78 on the adjacent track 68. On the end of the horizontal shaft beside the barrel is a second pinion 79 which meshes with a rack 80 that is secured to the side of the barrel. Thus, rotation of the knob 31 drives the pinion 79 to feed the rack 80, and therefore the focusing lens assembly 55, forwardly or backwardly to achieve the desired focus.

Figure 5:
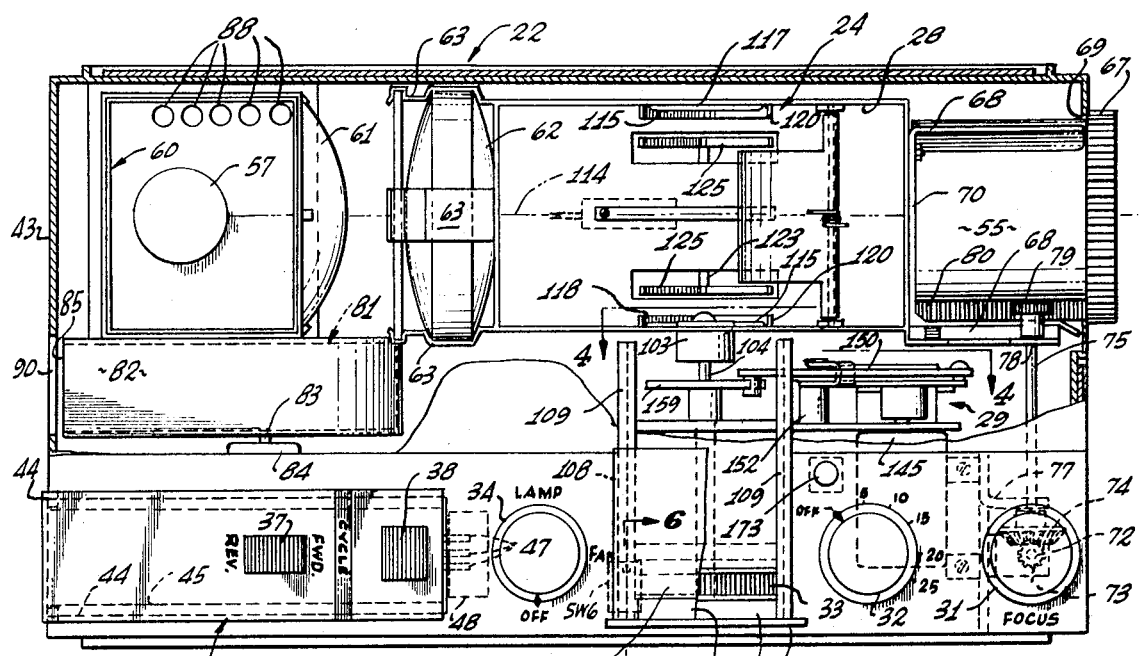
FIG. 5 is a top plan view, partly in cutaway section, illustrating the projector control panel, optical system and drive mechanism, the latter being in a moved position as compared to FIG. 4.

Cooling of the projector 20 during operation is accomplished by an improved cooling system including a blower 81 (see FIGS. 4 and 5) mounted within the case 21 and arranged to draw outside air through the lamp baffle 60 and also through the projection gate 24 and the zone between the culminating and condensing lenses 61 and 62. As shown in FIG. 5, the blower is positioned beside the lamp baffle in a housing or shroud 82 which extends forwardly beyond the front of the baffle. The side of the shroud facing toward the lamp 57 and toward the space in front of the baffle is open and forms the intake of the blower, which herein is of the squirrel cage type with a supporting shaft 83 driven by a motor partly shown at 84, the motor being mounted beneath the control unit 35. The shroud is generally circular (see FIG. 4) and has a rearwardly opening radial discharge port at 85.

The lamp baffle 60 is open at the upper end, as shown in FIG. 3, and is supported on a base 87 fast on the bottom wall 59, this wall being formed with several air inlet openings 88. Thus, air is drawn through the baffle and around the lamp both from above and from below to ensure that the lamp is effectively cooled. At the same time, the forwardly extending portion of the intake side of the blower shroud 82 opens directly into the space between the lenses 61 and 62 to ensure effective cooling of this space, including direct cooling of the heat-barrier disc 65.

It will be seen in FIG. 3 that a plurality of air-inlet openings 89 are formed in the bottom wall 59 of the case, and similar air-outlet openings 90 are formed in the rear wall 43 immediately behind the blower discharge port 85. The inlet openings are positioned beneath the projection gate 24 so that relatively cool, outside air circulated through the projector first flows through the gate and across the slide 23 therein to ensure that the slide is not heated to an excessive degree during projection, thus enhancing the operation of the machine. The blower discharges heated air directly out through the outlet openings 90.

Figure 2:
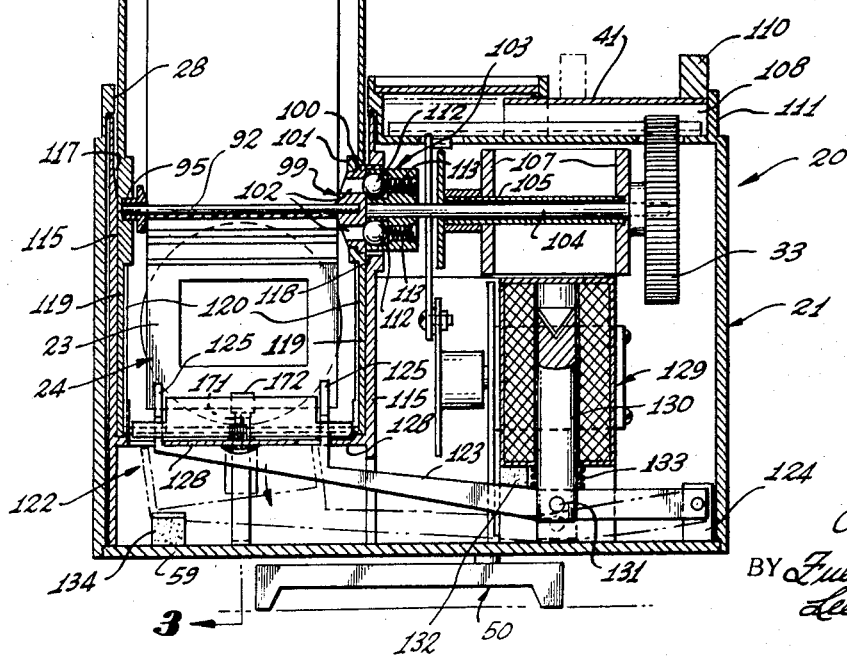
FIG. 2 is an enlarged sectional view taken along the line 2—2 of FIG. 1, illustrating the alignment mechanism, the scanning arrangement, and the driven mechanism coupling.

As best seen in FIGS. 1 and 2, the slide magazine 25 has a body generally in the form of a hollow box of rectangular horizontal cross section having open upper and lower ends, with the lower portion of the magazine fitted in the recess 28 and the upper portion extending upwardly out of the recess above the top wall 30 of the case. The endless, flexible slide carrier 27 is a belt that is trained around vertically spaced horizontal shafts 91 and 92, each journaled at its ends in a sidewall 93, 94 of the magazine, the lower shaft being flat sided and disposed below the top wall.

The opposite ends of the upper shaft 91 are pressed into coaxial, flanged bushings 95 which in turn, are rotatably received in opposed, vertically elongated grooves 97 in thickened portions of the sidewalls 93 and 94 with a spring finger 98 (FIGS. 2 and 3) on each sidewall engaging each bushing from below and stressed to urge the shaft 91 upwardly, thereby maintaining a selected approximate tension on the carrier 27 and exerting a light drag on turning of the shaft and feeding of the carrier. The left end (FIG. 2) of the lower shaft 92 is similarly mounted in a bushing 95 rotatably supported in a circular recess in a thickened portion of the left sidewall, and the right end of the lower shaft is fast in a coaxial coupling disc 99 that is rotatably mounted in a circular aperture in the right sidewall and held in place by interfitting annular flanges 100 and 101 on the disc and around the aperture.

Formed in the outer side of the coupling disc 99, which is flush with the outer side of the right sidewall 93, are four coupling elements 102, herein the outer end portions of bores extending into the disc. The disc is aligned with and closely adjacent to a coupling hub 103 that is carried on the end of a horizontal shaft 104 constituting the output shaft of the drive mechanism 29. This shaft is journaled in a bushing 105 fast in two spaced legs 107 of internal frame member of the projector, and projects beyond the frame member into the scanner wheel 33 to support the latter in the case and form a direct connection between the wheel and the coupling hub 103. During normal operation, either semiautomatic or fully automatic, the scanner wheel is beneath the sliding cover 41, which is of inverted, channel-shaped cross section and has two depending flanges 108 (see FIG. 4) which hook around and slide on transverse track bars 109, for movement of the cover away from the wheel to uncover the same. A rib 110 on top of the cover forms a grip, and an end plate 111 forms a stop for the cover, which renders the scanner wheel inaccessible when the cover is closed.

To connect the hub 103 to the disc 99 and the lower shaft 92, two yieldable coupling elements, herein balls 112 (FIG. 2), are movably mounted in bores in the hub and urged to the left by compressed springs 113 in the bores, projecting toward the disc to fit into the bores 102 therein and couple the hub to the disc for rotation of the latter with the output shaft 104. When the magazine 25 is removed from the projector 20, the balls are retained in the hub by suitable abutments, for example, material of the hub pressed inwardly over the left ends of the bores in the hub.

Thus, the spring-loaded balls 112 cooperate with the disc 99 and the bores 102 to form a quick-connect and quick-release clutch that operates automatically as an incident to the insertion of a magazine 25 into the projector recess 28, and also in response to a lifting force tending to pull the magazine out of the recess. If the balls and the bores are not perfectly aligned, the coupling operation is completed during subsequent initial turning of the coupling hub relative to the coupling disc.

It is important that the magazine 25 be held securely in place in the projector 20 and precisely located relative to the optical axis 114 (FIG. 5) for optimum quality of projection, and also for proper coupling engagement of the ball-clutch elements. At the same time, ease of insertion of the magazine is important so that the initial setup and subsequent magazine changes can be made quickly and easily without complex and time-consuming manipulation of the parts. For these purposes, the magazine and the recess 28 are designed for free insertion of the magazine in the projector with a loose, clearance fit, and to guide the magazine into, and subsequently to hold it in, the precise position for optimum projection.

As shown in FIGS. 2 and 3, the opening in the top wall 30 of the case 21 is substantially larger than the cross-sectional area of the magazine, and the lower central portion 115 of each sidewall of the recess is thickened to form two inwardly inclined cams 117 and 118 leading to vertical wall surfaces that are spaced to receive the lower portion of the magazine with a snug fit. Thus, the cams 117, 118 guide the magazine laterally into the proper transverse position.

For proper vertical and front-to-rear positioning, two downwardly tapered, generally V-shaped lugs 119 (see FIGS. 3 and 9) are joined to the lower edges of the magazine sidewalls, preferably midway between the front and rear of the magazine, to extend downwardly in the plane of the magazine's sidewalls 93 and 94, the outer sides of the lugs being flush with the sidewalls. On the lower portions of the sidewalls of the recess are two V-shaped guides 120 (see FIGS. 3 and 5) which receive the lugs as the magazine drops into the recess. The guides define seats of the same shape as the lugs and thus cam the magazine into the proper front-to-rear position as the lugs move into the seats. Preferably, the thickened portions 115 of the recess sidewalls are primarily within the guides 120, as illustrated in FIGS. 3 and 5, so that the cams 117 and 118 act first on the lugs 119 and then on the lower end portions of the magazine sidewalls, to hold the magazine firmly in place during operation of the projector.

Preferably, the body of the magazine 25 is of one-piece construction of suitable, lightweight and inexpensive material, such as plastic, with the lugs 119 formed as integral projections thereof. On the upper edges of the sidewalls 93 and 94 are two similar lugs 121 which shield the slide 23 projecting upwardly from the upper shaft 91 and thus protect the slide from inadvertent damage if the magazine is set on end. Of course, the lower lugs serve this same purpose.

Although the magazine 25 is accurately positioned in the projector 20 and the flat-sided lower shaft 92 thus is precisely located relative to the optical elements, the slide 23 hanging below the shaft can swing or tilt to some degree out of the proper position. To correct this, an aligning device 122 (FIG. 2) is incorporated in the projector 20 to press each slide in the projection gate 24 firmly against the shaft while bringing the lower edge of the slide into precise vertical alignment with the shaft, thereby locating the slide positively for projection.

In this instance, the aligning device 122 comprises an elongated arm 123 pivoted at one end on a post 124 on the bottom wall 59 adjacent the right sidewall of the case 21, with its free end portion disposed beneath the projection gate 24 and carrying two upwardly opening forks 125 that are positioned in vertical alignment with the lower shaft 92 and are spaced apart to engage a slide 23 adjacent the lower corners thereof when the forks are raised as shown in FIG. 2. In the centers of the forks are upwardly opening notches (FIG. 3) that receive and hold the slide after the flaring legs of the forks have cammed the slide into vertical alignment with the shaft. A simple, inverted U-shaped guide 127 fastened to the bottom wall 59 maintains the arm in the plane of the lower shaft at all times.

In the raised position of the arm 123 shown in full in FIG. 2, the forks 125 extend upwardly through a wall 128 partially closing the lower end of the magazine recess 28, and in the lowered position, shown in broken lines, the forks are lowered away from the slide. Movement of the aligning device between these two positions is effected by a solenoid 129 disposed above the intermediate portion of the arm 123 and having a vertically movable core 130 pivotally connected at 131 to the arm so that upward movement of the core upon energization of the coil of the solenoid raises the arm and the forks. A bumper 132 above the arm cushions contact of the arm with the end of the solenoid, thereby preventing shock and objectionable noise, and a coil spring 133 between the solenoid and the arm urges the arm toward the lowered position, a second bumper 134 under the forked end of the arm cushioning the stroke stroke.

The slides 23 are held on the film carrier 27 in a plurality of spring clips 135 (see FIGS. 10 and 11) which are secured to the outer side of the belt in transversely extending, side-by-side relation so as to be parallel to the shafts 91, 92 supporting the belt in the magazine. Each clip is of the same length as the width of the belt and has a flat base 137 bonded thereto with suitable adhesive. Extending away from the belt are two spring fingers integral with the base and having free outer ends that are more closely spaced, when free, than the width of the usual frame of a slide, the fingers preferably being pressed together for optimum gripping when a slide is in the clip.

As shown most clearly in FIG. 11, the free edge portions 138 of the fingers are inclined away from each other to form diverging tips for facilitating the spreading of the fingers during insertion of slides, and the main gripping portions 139 of the fingers diverge inwardly from these tips at an angle that is selected so that slides within the clips will be gripped firmly along substantially the full length of the gripping portions, as shown in broken lines in FIG. 11.

To hold the slides 23 in spaced relation with the carrier 27, a positioning stop 140 is formed in each clip 135 by opposed abutments extending toward each other from the portions of the spring fingers adjacent the base, the abutments herein comprising opposed shoulders on the adjacent sides of the fingers formed by bends 141 of V-shaped cross section joined to the base of the clip by substantially parallel side portions 142 of the fingers, and joined to the gripping portions 139 by reverse, V-shaped bends at 143. The stop shoulders 140 are more closely spaced than the thickness of the slide frame.

With this arrangement, the flexing of the spring fingers during opening of a clip 135 to receive a slide 23 takes place primarily adjacent the reverse bends 143, and the stop shoulders 140 remain more closely spaced than the thickness of the slide frame to abut against the inner edge of the slide and form a false bottom in the clip that holds the slide away from the carrier 27. This is important from the standpoint of spacing the slide in the projection gate 24 far enough below the lower shaft 92 of the magazine 25 to ensure that it is below the adjacent slides projecting forwardly and rearwardly from the front and rear sides of the shaft. These slides tend to droop, or hand down, to some extent as permitted by the flexibility of the carrier 27, and thus have free edge portions that may be spaced somewhat below the shaft. By spacing the upper edge of the slide in the projection gate an even greater distance below the shaft, for example, one-eighth of an inch, the possibility of interference and a resulting shadow is eliminated.

From the foregoing, it will be seen that the slide clip 135 may be a one-piece unit composed of suitable resiliently flexible spring material capable of economical mass production. For mass-production assembly of the clips on carriers 27, the latter preferably are flexible belts composed of strip material of a type having a precoat of adhesive on one side for bonding the clips to the belt. One suitable product for this purpose is that sold by Minnesota Mining and Manufacturing Co., St. Paul, Minnesota, as "Scotch" Brand tape No. Y-9087, which is basically a glass cloth coated with a thermosetting adhesive.

Using such tape, an advantageous assembly method includes the steps of feeding a preselected length of the strip material from a supply roll, cutting the ends on a bias, other than 90°, so that the end edges are parallel and will fit together in edge-to-edge relation as shown in FIG. 10, and, with the end edges together, the clips 135 are placed on the belt in side-by-side relation. After the belt is filled, the assembly is cured to perfect the bonds between the clips and the belt.

This construction of the carrier 27 has the advantage of using the clips 135 themselves to join the two ends of the belt strip together, thus eliminating the need for an endless belt in the first instance and permitting economical mass production of the carrier with readily available strip material. Since several clips span the joint between the ends of the belt strip, the joinder is secure and permanent.

The reversible indexing drive mechanism 29, shown most clearly in FIGS. 4 and 5, makes use of the same basic components used in the aforesaid patent. A reversible electric motor 145 is mounted in the case 21 adjacent the front wall with its output shaft 147 horizontally disposed and with a crank disc 148 thereon pivotally connected at 149 to the lower end of an upwardly and rearwardly inclined crank arm 150 which is slidably pivoted between its ends on a horizontal guide pin 151 carried by a bracket 152 on the side of a strut 153 inside the case. A coiled extension spring 154 is stretched between the arm and an anchor 155 on the bottom wall 59 to hold the arm against the guide, and a crank pin 157 projects laterally from the arm adjacent its upper end to overlie a drive wheel 158. This wheel is fast on the intermediate portion of the output shaft 104 carrying the coupling hub 103, and has a series of equally spaced peripheral notches 159, herein four, for receiving the pin 157 on the crank arm and coupling the arm to the wheel during slide-changing cycles.

With the crank arm 150 and the drive wheel 158 positioned as shown in full lines in FIG. 4, rotation of the crank disc 148 from the start position shown, in the direction of the arrow 160, first shifts the crank arm rearwardly while rocking its upper end downwardly to move the pin 157 along an arc 161 into a notch 159 adjacent the top of the wheel as the pivot 149 moves to the position indicated at 149a and the arm moves to the position indicated at 150a. During continued rotation of the disc and movement of the pivot to the position indicated at 149b, the arm moves endwise to the left to the position at 150b and the pin 157 is pulled to the position indicated at 157b, thereby turning the drive wheel 158 through a 90° angle. A cam 162 on the underside of the arm rides over the guide pin 151 to raise and lower the pin according to the arc of the wheel 158.

Of course, this turning of the wheel 158 also turns the shaft 104, the hub 103, the coupling disc 99, and the lower magazine shaft 92 through 90° to advance one slide 23 out of the projection gate 24 and a new slide into the gate. As the disc 148 and the pivot 149 complete one revolution and move back to the start position, the crank pin 157 is disengaged from the wheel 158 and shifted back to the start position shown in full lines, leaving the drive wheel in the new position with the next notch 159 positioned to receive the crank pin during the next slide-changing cycle. The motor 145 is stopped, and preferably braked, in the start position so that the cycle is completed after one revolution. When the motor is energized in the opposite direction under the control of the reversing switch button 37, the action of the drive mechanism is reversed and the drive wheel is turned one step in the opposite direction during each slide-changing cycle to feed the slide carrier 27 in reverse.

CONTROL OF THE SLIDE-CHANGING CYCLE

The projector 20 is capable of semiautomatic slide changing with manual control of the dwell interval between slide changes, and for fully automatic operation with timed control of the interval. The cycle-switch button 38 initiates slide changes when the projector is in the manually actuated mode, and automatic operation is initiated by means of the time-sequence knob 32 for actuating and adjusting an automatic timer 163 (FIG. 12).

In the simplified schematic wiring diagram in FIG. 12, it will be seen that the control circuitry includes the usual plug-in cord 164 for connection to a 115 volt AC power supply, and a three-position switch SW1 which is operated by the on-off knob 34 (FIGS. 1 and 5) to deenergize the projector in a first position of the switch and knob, to complete an energizing circuit through lines L1 and L2 for the motor 84 of the blower 81 in a second position, and to energize both the blower motor and the lamp 57 in a third position, the lamp being energized across lines L2 and L3 through a normally closed switch SW2 in line L3.

Reduced voltage for the drive motor 145, the coil of the solenoid 129 and the timer 163 is derived from a secondary winding (not shown) of the blower motor 84 through lines L4 and L5, and is converted to DC by a full wave rectifier bridge 165.

When switch SW1 is set to energize the blower motor 84 and the lamp 57, an energizing DC circuit for the drive motor 145 is prepared from the negative terminal of the rectifier 165 to the left-hand side of the motor, as viewed in FIG. 12, through a line L6, a line L7, a switch SW4 that is open unless closed by the cycle switch button 38, switch SW5a, and a line L8 to the motor. At the same time, the right-hand side of the motor is connected to the positive terminal of the rectifier by a line L9, a normally closed switch SW6, a line L10, switch SW5b, and a line L11 to the motor. Thus, closure of switch SW4 with the cycle switch button initiates forward motor operation to start a slide-changing cycle.

On one side of the crank disc 148 (FIG. 4) is a cam lobe 167 which is disposed in the position shown in FIG. 4 in the dwell position of the disc. This lobe engages the operator 168 of a switch assembly 169 containing switches SW2 and SW3 and, when in the dwell position, maintains the switches in the positions shown in FIG. 12 with switch SW2 closed and switch SW3 closed in the full line position in the circuit of the solenoid 129 and open between line L6 and a line L12 leading to switch SW5a. As soon as the drive motor 145 turns the cam lobe 167 away from the operator 168, however, switch SW2 is opened in the lamp circuit to turn off the lamp during the slide change, and switch SW3 is shifted to the broken line position to complete an alternate or holding connection between the negative terminal of the rectifier 165 and the left side of the motor, bypassing the cycle switch SW4 which thus can be released without affecting motor operation.

Accordingly, the motor 145 continues to run until the cycle is completed and the cam lobe 167 is returned to the dwell position (FIG. 4). When this occurs, switch SW2 is closed to reenergize the lamp 57 (with a new slide in the projection gate 24) and switch SW3 is returned to the full line position to deenergize the drive motor and energize its brake, thus stopping the drive mechanism while the cam lobe is in engagement with the operator 168. If a brake is not included, the cam lobe is made long enough to accommodate the coasting as the motor stops. At the same time, the coil of the solenoid 129 is energized to raise the aligning arm 123 and bring the forks 125 into engagement with the new slide. The drive mechanism then remains in this condition until the cycle switch SW4 is closed to initiate another slide change.

In this manner, the lamp is turned off, then back on, during changes to achieve a highly desirable fadeout, fade-in effect during, and as an incident to, slide changes. Combined with positive cooling of the lamp, this has been found to be effective to materially increase the life of bulbs, for increased operating economy.

In the preferred embodiment of the invention, the drive motor 145 is selected and geared to complete slide changes within about 1 second, and it has been found that this rapid operation can result in movement of a slide 23 out of the projection position before the lamp filament has ceased producing light. As the slide moves to a 45° angle with the vertical, a momentary streak can be produced on the projection screen, with a disruptive effect on the fade-in, fadeout operation.

To eliminate this, a shutter 174 (FIGS. 3 and 4) is pivoted on a pin 175 on the bottom 128 of the magazine recess 28, between the projection gate 24 and the focusing assembly 55, and is yieldably biased into the full line position in FIG. 3 in which the shutter is inclined upwardly and rearwardly toward the projection gate but is below the path of light projection. It will be seen that the tip of the shutter is in the path of the lower portions of the slide frames, and thus is engaged and swung forwardly into the upright, blocking position at 174a as a slide moves to the inclined position indicated at 23a. In this manner, each slide activates the shutter to block light from passing beneath the moving slides.

While a similar shutter could be provided behind the film gate 24 for reverse operation, it is believed desirable to permit the light streak to be produced, thus providing a visible indication on the screen that the projector is operating in reverse. During reverse operation, the shutter 174 is simply pressed down by successive slides, and so does not interfere with normal operation. A light spring assembly 177 biases the shutter back into the full line position in both directions of shutter movement.

To reverse the direction of projector operation, the reversing switch button 37 simply is moved to the "reverse" position indicated on the top of the control unit 35. This changes switches SW5a and SW5b to their alternate positions and reverses the polarity of the drive motor 145 to energize the motor reversely and drive the crank disc 148 in the opposite direction, all other aspects of the operation remaining the same.

For fully automatic operation, a normally open switch SW7 is closed by rotating the time-sequence knob 32 out of the "off" position, thus completing the energizing circuit for the timer 163. This element may be of any suitable construction, typically thermoelectric or electronic, for periodically completing a momentary energizing circuit for the drive motor 145 around the cycle switch SW4 and thereby initiating a slide-changing cycle in the same manner as does closure of switch SW4. One suitable electronic time is shown in the commonly owned and copending application of Gary Peterson entitled "Automatic Slide-Changing Mechanism."

Just as in the manually actuated, semiautomatic cycle, when the cam lobe 167 leaves the operator 168, switch SW2 is opened to turn off the lamp 57 and switch SW3 is changed to the broken line position to maintain the energization of the drive motor until the cycle is complete, then opening to terminate the cycle. Such termination reenergizes the lamp to project the new slide.

It will be seen that the cycle switch SW4 remains effective to initiate a slide change by overriding the time 163, and the the reversing switches SW5a and SW5b are operable to change to fully automatic, reverse operation. The timer should be adjustable to vary the timed viewing interval within a selected range, for example, from a few seconds to 1 minute.

In some instances, it is desirable to provide for fully manual slide changing so as to be able to scan the full supply of slides 23 in the magazine 25. For this purpose, the scanner wheel 33 is coupled directly to the output shaft 104 of the drive mechanism 29, and is freely rotatable except for the restraining effect of the aligning device 122 on the slide in the projection gate 24.

To disable the aligning device 122 for such scanning, while maintaining the blower 81 in operation and the lamp 57 in the energized condition to project the slides 23 as they are scanned, the movement of the cover 41 for the scanner wheel 33 to the open position automatically opens a switch SW6 (FIGS. 5, 6 and 12) in the circuit of the coil of the solenoid 129 beyond the lamp and blower circuits. This also breaks the circuit of the drive motor 145. After scanning is complete, the cover 41 must be returned to the closed position to close switch SW6 in the solenoid and motor circuits before resuming normal operation.

Figure 6:
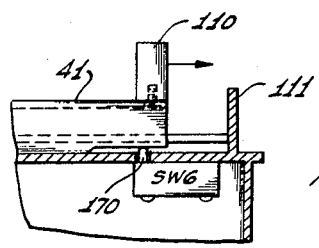
FIG. 6 is a fragmentary sectional view taken along the line 6—6 of FIG. 5.

While switch SW6 may be actuated in various ways, herein it is suspended beneath the top wall 30 of the case 21, as shown in FIG. 6, with its operator 170 projecting upwardly into the path of one of the flanges 108 mounting the cover of its tracks 109. The switch is open when the operator is up, and closed when the operator is pressed down as the cover flange moves with the cover toward the closed position. Thus, the conversion to and from the scanning mode is simply a matter of sliding the cover back and forth, and automatically converts the circuit to and from the scanning condition.

With an endless series of slides 23 in the magazine 25, it is desirable to have an automatic indicator for signaling return of the initial slide of the series of the projection gate 24 in order to alert the user of the projector 20 to the fact that all of the slides have been viewed. For this purpose, the operator 171 (FIGS. 2 and 3) of a normally open signal switch SW8 (FIGS. 3 and 12) is positioned beneath the projection gate, on top of the bottom wall of the magazine recess 28, and an actuating clip 172 (FIG. 2) is fastened to the free edge of a selected slide and positioned to engage the operator and close the switch in the energizing circuit of a signal lamp 173 (FIGS. 1 and 12) suitably located on the case to be visible to the user of the projector.

Herein, the switch SW8 is suspended beneath the magazine recess 28 and the switch operator 171 is an elongated flexible leaf (see FIG. 3) supported in cantilever fashion on the switch to extend beneath the projection gate 24 and be engaged by the actuating clip 172 as the slide enters the gate. The lamp 173 is wired across lines L1 and L2 and thus is lighted when switch SW8 is closed.

From the foregoing, it will be evident that the present invention provides a new and improved slide projector having several important features cooperating with each other to increase the effectiveness of operation, the quality of projection and the convenience of operation of the projector. While a particular form of the invention has been illustrated and described, various modifications can be made without departing from the spirit and scope of the invention.

I claim as my invention:

1. A slide projector having, in combination;

a case having front, rear and top sides;

an optical system housed within said case and including a lamp adjacent said rear side, and at least two lenses in front of said lamp, said lenses being spaced apart to define a projection gate and aligned with said lamp along an optical axis of the projector;

a slide magazine having a boxlike body open at least at one end and including an endless slide carrier for holding a series of slides in outwardly extending relation with said carrier, said carrier being mounted in said body for movement along an endless path by mounting means whereby successive slides on said carrier are movable into a projection position extending outwardly through said end;

said case having a recess in one side thereof receiving and holding said magazine with said open end adjacent said projection gate and with a slide in said projection position disposed in said gate between said lenses;

means on said case and said magazine for guiding the latter into a precisely located operating position relative to said axis as an incident to the insertion of the magazine in said recess, and subsequently holding the magazine in said operating position during projection of slides;

said guiding means including first V-shaped positioning elements on opposite sides of said magazine projecting away from said open end along opposite sides of said gate, and second positioning elements on said case forming V-shaped seats on opposite sides of said gate for receiving said first positioning elements and camming the same into preselected positions to guide said magazine into said operating position;

selectively operable drive mechanism in said case having a rotary output member movable step by step through preselected increments when said mechanism is operating;

and means on said magazine and in said case for coupling said output member to said slide carrier when said magazine is in said operating position thereby to feed successive slides on said carrier into said projection position.

2. A slide projector as defined in claim 1 in which said recess opens toward said projection gate through said top side, and said first V-shaped positioning elements are lugs secured to the lower edges of said magazine, and said second positioning elements define upwardly opening V-shaped seats for receiving said lugs and camming the latter and the magazine in a front-to-rear direction into said operating position while locating the magazine vertically as well.

3. A slide projector as defined in claim 2 in which said V-shaped seats have side surfaces engageable with the side surfaces of said lugs to locate the magazine laterally in said recess.

4. A slide projector as defined in claim 3 in which said recess is defined adjacent said top side of said case by surfaces that are spaced to receive said magazine with a loose clearance fit for free insertion of the magazine therein, said sides of said seats being more closely spaced than the corresponding surfaces of said recess adjacent said top wall to receive said lugs with a snug fit, and said second elements having upwardly and outwardly inclined cam surfaces for guiding said lugs into said seats.

5. A slide projector having, in combination;

a case having front, rear and top sides;

an optical system housed within said case and including a lamp adjacent said rear side, and at least two lenses in front of said lamp, said lenses being spaced apart to define a projection gate and aligned with said lamp along an optical axis of the projector;

a slide magazine having a boxlike body open at least at one end and including an endless slide carrier for holding a series of slides in outwardly extending relation with said carrier, said carrier being mounted in said body for movement along an endless path by mounting means including a shaft extending across said open end whereby successive slides on said carrier are movable into a projection position extending outwardly away from said shaft through said end;

said case having a recess in said top side for receiving and holding said magazine with said open and adjacent said projection gate and with a slide in said projection position disposed in said gate between said lenses;

means on said case and said magazine for guiding the latter into the proper operating position relative to said axis as an incident to the insertion of the magazine in said recess, and subsequently holding the magazine in said operating position during projection of slides;

selectively operable drive mechanism in said case having a rotary output member movable step by step through preselected increments when said mechanism is operating;

and means on said magazine and in said case for coupling said output member to said slide carrier when said magazine is in said operating position thereby to feed successive slides on said carrier into said projection position;

said magazine being inserted vertically in said recess, and said shaft being journaled on the magazine to extend across the lower end portion thereof, and said mounting means including a second shaft spaced above the first-mentioned shaft and supported for up and down sliding;

a spring adjacent each end of the second shaft urging the latter upward to tension said carrier, said springs being elongated wires each anchored on the magazine and extending under said second shaft, and being stressed to raise the shaft and also to apply a light friction drag to the second shaft.

6. A slide projector having, in combination;

a case having front, rear and top sides;

an optical system housed within said case and including a lamp adjacent said rear side, and at least two lenses in front of said lamp, said lenses being spaced apart to define a projection gate and aligned with said lamp along an optical axis of the projector;

a slide magazine having a boxlike body open at least at one end and including an endless slide carrier for holding a series of slides in outwardly extending relation with said carrier, said carrier being mounted in said body for movement along an endless path by mounting means including a shaft extending across said open end whereby successive slides on said carrier are movable into a projection position extending outwardly away from said shaft through said end;

said case having a recess in one side thereof receiving and holding said magazine with said open end adjacent said projection gate and with a slide in said projection position disposed in said gate between said lenses;

means on said case and said magazine for guiding the latter into the proper operating position relative to said axis as an incident to the insertion of the magazine in said recess, and subsequently holding the magazine in said operating position during projection of slides;

selectively operable drive mechanism in said case having a rotary output member movable step by step through preselected increments when said mechanism is operating;

and means on said magazine and in said case for coupling said output member to said slide carrier when said magazine is in said operating position thereby to feed successive slides on said carrier into said projection position;

said carrier comprising an endless flexible belt formed by a flexible strip of material having parallel end edges cut on a bias and fitted together, and a plurality of side-by-side transverse clips thereon parallel to said shaft and opening outwardly to receive and grip the edge portions of slides, said clips being bonded to said belt with several clips spanning the joint between said end edges and thereby holding said end edges together.

7. A slide projector having, in combination;

a case having front, rear and top sides;

an optical system housed within said case and including a lamp adjacent said rear side, and at least two lenses in front of said lamp, said lenses being spaced apart to define a projection gate and aligned with said lamp along an optical axis of the projector;

a slide magazine having a boxlike body open at least at one end and including an endless slide carrier for holding a series of slides in outwardly extending relation with said carrier, said carrier being mounted in said body for movement along an endless path by mounting means whereby successive slides on said carrier are movable into a projection position extending outwardly through said end;

said case having a recess in one side thereof receiving and holding said magazine with said open end adjacent said projection gate and with a slide in said projection position disposed in said gate between said lenses;

means on said case and said magazine for guiding the latter into the proper operating position relative to said axis as an incident to the insertion of the magazine in said recess, and subsequently holding the magazine in said operating position during projection of slides;

selectively operable drive mechanism in said case having a rotary output member movable step by step through preselected increments when said mechanism is operating;

means on said magazine and in said case for coupling said output member to said slide carrier when said magazine is in said operating position thereby to feed successive slides on said carrier into said projection position;

and two lugs which project beyond said open end on opposite sides of said projection position, at least as far as the free edge of the slide in said projection position, to protect the slide while the magazine is out of the recess, said lugs constituting part of said means for guiding the magazine into said operating position.

8. A slide projector as defined in claim 7 in which said mounting means for said carrier also includes a second shaft adjacent the opposite end of the magazine, said opposite end being open and also having two lugs projecting outwardly beyond said opposite ends to protect slides projecting outwardly from the second shaft.

9. A slide projector having, in combination;
a case having front, rear and top sides;
an optical system housed within said case and including a lamp adjacent said rear side, and at least two lenses in front of said lamp, said lenses being spaced apart to define a projection gate and aligned with said lamp along an optical axis of the projector;
a slide magazine having a boxlike body open at least at one end and including an endless slide carrier for holding a series of slides in outwardly extending relation with said carrier, said carrier being mounted in said body for movement along an endless path by mounting means whereby successive slides on said carrier are movable into a projection position extending outwardly through said end;
said case having a recess in one side thereof receiving and holding said magazine with said open end adjacent said projection gate and with a slide in said projection position disposed in said gate between said lenses;
means on said case and said magazine for guiding the latter into the proper operating position relative to said axis as an incident to the insertion of the magazine in said recess, and subsequently holding the magazine in said operating position during projection of slides;
selectively operable drive mechanism in said case having a rotary output member movable step by step through preselected increments when said mechanism is operating;
means on said magazine and in said case for coupling said output member to said slide carrier when said magazine is in said operating position thereby to feed successive slides on said carrier into said projection position;
means for sensing and signaling the beginning of the series of slides and thereby indicating when the full series on said endless carrier has been viewed, comprising a signal device on said case, an operator for said device in said case, and a clip mountable on one of said slides for engaging said operator and activating said device as said one slide enters said gate.

10. A slide projector having, in combination;
a case having front, rear and top sides;
an optical system housed within said case and including a lamp adjacent said rear side, and at least two lenses in front of said lamp, said lenses being spaced apart to define a projection gate and aligned with said lamp along an optical axis of the projector;
a slide magazine having a boxlike body open at least at one end and including an endless slide carrier for holding a series of slides in outwardly extending relation with said carrier, said carrier being mounted in said body for movement along an endless path by mounting means including a shaft extending across said open end whereby successive slides on said carrier are movable into a projection position extending outwardly away from said shaft through said end;
said case having a recess in one side thereof receiving and holding said magazine with said open end adjacent said projection gate and with a slide in said projection position disposed in said gate between said lenses;
means on said case and said magazine for guiding the latter into a precisely located operating position relative to said axis an an incident to the insertion of the magazine in said recess, and subsequently holding the magazine in said operating position during projection of slides;
selectively operably drive mechanism in said case having a rotary output member movable step by step through preselected increments when said mechanism is operating;
and means on said magazine and in said case for coupling said output member to said slide carrier automatically as said magazine is moved into said operating position thereby to feed successive slides on said carrier into said projection position, and including a quick-connect, quick-disconnect clutch between one end of said shaft and said output member, brought into coupling engagement as said magazine is moved into said operating position said clutch comprising a first clutch member on said output member having yieldable coupling elements projecting toward said magazine in coaxial relation with said shaft, and a second clutch member on the adjacent end of the shaft having recesses for receiving said yieldable coupling elements, said magazine having surfaces thereon for shifting said yieldable coupling elements out of the way as the magazine is inserted into said recess.

11. A slide projector as defined in claim 10 in which said first clutch member is a hub turned by said output member, and said yieldable coupling elements are balls supported in bores in said hub and spring urged toward said shaft, said hubs having means thereon for retaining said balls against complete displacement from said hub.

* * * * *